(12) United States Patent
Boregowda et al.

(10) Patent No.: US 8,370,157 B2
(45) Date of Patent: Feb. 5, 2013

(54) AIRCRAFT SPEECH RECOGNITION AND VOICE TRAINING DATA STORAGE AND RETRIEVAL METHODS AND APPARATUS

(75) Inventors: Lokesh Rayasandra Boregowda, Karnataka (IN); Meruva Jayaprakash, Karnataka (IN); Koushik Sinha, West Bengal (IN)

(73) Assignee: Honeywell International Inc., Morristown, NJ (US)

( * ) Notice: Subject to any disclaimer, the term of this patent is extended or adjusted under 35 U.S.C. 154(b) by 181 days.

(21) Appl. No.: 12/832,651

(22) Filed: Jul. 8, 2010

(65) Prior Publication Data
US 2012/0010887 A1 Jan. 12, 2012

(51) Int. Cl.
*G10L 15/22* (2006.01)
*G10L 15/20* (2006.01)

(52) U.S. Cl. .................. 704/270; 704/275; 704/226

(58) Field of Classification Search .......... None
See application file for complete search history.

(56) References Cited

U.S. PATENT DOCUMENTS

| | | | |
|---|---|---|---|
| 5,774,841 A | 6/1998 | Salazar et al. | |
| 6,044,346 A * | 3/2000 | Ali et al. ............... | 704/270 |
| 6,278,786 B1 | 8/2001 | McIntosh | |
| 6,606,599 B2 | 8/2003 | Grant et al. | |
| 6,766,983 B2 | 7/2004 | D'Alvia | |
| 6,845,302 B2 | 1/2005 | Moretto | |
| 6,915,986 B2 | 7/2005 | D'Alvia | |
| 7,386,443 B1 | 6/2008 | Parthasarathy et al. | |
| 2001/0033639 A1 | 10/2001 | Martin | |
| 2002/0035471 A1 | 3/2002 | Breton | |
| 2002/0087319 A1 | 7/2002 | Stephenson | |
| 2002/0107694 A1 | 8/2002 | Lerg | |
| 2003/0171930 A1* | 9/2003 | Junqua ................. | 704/275 |
| 2003/0171932 A1 | 9/2003 | Juang et al. | |
| 2004/0015365 A1 | 1/2004 | Ohmori et al. | |
| 2004/0196984 A1 | 10/2004 | Dame et al. | |
| 2006/0282265 A1* | 12/2006 | Grobman et al. ........ | 704/246 |
| 2007/0019824 A1 | 1/2007 | Osmanovic et al. | |
| 2007/0082706 A1 | 4/2007 | Campbell et al. | |
| 2007/0213981 A1 | 9/2007 | Meyerhoff et al. | |
| 2007/0241936 A1 | 10/2007 | Arthur et al. | |
| 2007/0288242 A1 | 12/2007 | Spengler et al. | |
| 2008/0065275 A1* | 3/2008 | Vizzini ................. | 701/2 |
| 2008/0082332 A1 | 4/2008 | Mallett et al. | |
| 2008/0114603 A1 | 5/2008 | Desrochers | |
| 2008/0249771 A1 | 10/2008 | Wahab | |
| 2011/0125503 A1* | 5/2011 | Dong et al. ............ | 704/275 |

FOREIGN PATENT DOCUMENTS
EP 2200020 A2 6/2010

OTHER PUBLICATIONS

EP Search Report, EP 11171775.7-1224 dated Sep. 19, 2011.
Rabiner, Lawrence R., Fellow "A Tutorial on Hidden Markov Models and Selected Applications in Speech Recognition," Proceedings of the IEEE, vol. 77, No. 2, Feb. 1989.
Ronzhin, Andrey L. et al. "Survey of Russian Speech Recognition Systems," Speech Informatics Group, St. Petersburg Institute for Informatics and Automation of the Russian Academy of Sciences (SPIIRAS), Russia; SPECOM'2006, St. Petersburg, Jun. 25-29, 2006.
Jiang, Hui "Confidence Measures for Speech Recognition: A Survey," Department of Computer Science, York University, Canada; Received Aug. 3, 2004; received in revised form Nov. 26, 2004; accepted Dec. 27, 2004.
EP Communication, EP 11171775.7-1224 dated May 10, 2011.

* cited by examiner

*Primary Examiner* — Talivaldis Ivars Smits
(74) *Attorney, Agent, or Firm* — Ingrassia Fisher & Lorenz, P.C.

(57) ABSTRACT

A speech recognition system and a personal speech profile data (PSPD) storage device that is physically distinct from the speech recognition system are provided. In the speech recognition system, a PSPD interface receives voice training data, which is associated with an individual and the operating conditions of an aircraft, from the PSPD storage device. A speech input module produces a digital speech signal derived from an utterance made by a system user. A speech processing module accesses voice training data stored on the PSPD storage device through the PSPD interface, and executes a speech processing algorithm that analyzes the digital speech signal using the voice training data, in order to identify one or more recognized terms from the digital speech signal. A command processing module initiates execution of various applications based on the recognized terms. Embodiments may be implemented in various types of host systems, including an aircraft cockpit-based system.

19 Claims, 5 Drawing Sheets

AIRCRAFT SPEECH RECOGNITION AND VOICE TRAINING DATA STORAGE AND RETRIEVAL METHODS AND APPARATUS

TECHNICAL FIELD

The embodiments generally relate to speech processing methods and apparatus, and more particularly to speech recognition methods and apparatus used in the context of voice-activated operations of a host system.

BACKGROUND

In modern aircraft, advances in sensor and information processing technologies have lead to a significant increase in the amount of information available to a pilot. Although this generally enables the pilot to gain a better situational awareness at any given time, the pilot often is required to scan information from several sources in order to gain that situational awareness. In addition, with the increased complexity of modern aircraft, the pilot may be required to control more aircraft systems and sub-systems than were present in less technologically complex aircraft of the past.

During aircraft operations, a pilot is required to accurately determine and maintain continual awareness of various elements of the current aircraft status, such as speed, altitude, location, direction of flight, external atmospheric conditions, cabin conditions, fuel status, and rate of change of various parameters, among a host of other things. Furthermore, it is particularly important to ensure, during take-off and landing, that the aircraft is functioning normally within various parameter bounds, and that external conditions are favorable for the take-off or landing maneuvers. However, in general, given the number of parameters that a pilot needs to accurately determine and monitor during the various phases of aircraft operations, the pilot may have very limited time to make important decisions regarding control of the aircraft. In addition, the pilot frequently may be required to remove a hand from the control instrumentation and to divert his or her attention from the task at hand to manipulate physical components of a user interface (e.g., keys, dials, buttons, levers, and so on) in order to alter the aircraft operations in light of the information associated with the monitored parameters. The monitoring and control of the aircraft may impose a considerable amount of strain on a pilot, at times. Accordingly, what are needed are enhanced user interfaces for aircraft and other systems, which enable a system user (e.g., a pilot) to interact with the aircraft in a less onerous manner.

BRIEF SUMMARY

An embodiment includes a speech recognition system comprising a personal speech profile data (PSPD) interface, a speech input module, and a speech processing module. The PSPD interface is configured to receive voice training data, which is associated with an individual, from a PSPD storage device that is physically distinct from the speech recognition system. The speech input module is configured to produce a digital speech signal derived from an utterance made by a system user. The speech processing module is operatively coupled to the speech input module, and is configured to access the voice training data stored on the PSPD storage device through the interface, and to execute a speech processing algorithm that analyzes the digital speech signal using the voice training data, in order to identify one or more recognized terms from the digital speech signal.

Another embodiment includes a portable data storage device comprising data storage and a speech recognition system interface. The data storage is configured to store voice training data associated with an individual. The speech recognition system interface is operatively coupled with the data storage, and is configured to interact with a portable data storage device interface of a speech recognition system in order to provide access to the voice training data to the speech recognition system. The data storage device is physically distinct from the portable data storage device interface and the speech recognition system.

Another embodiment includes a method for performing speech processing, which is performed by a speech recognition system. The method includes accessing voice training data, which is associated with an individual, from a PSPD storage device that is physically distinct from the speech recognition system, and producing a digital speech signal based on an utterance made by a system user. The method also includes executing a speech recognition algorithm that analyzes the digital speech signal using the voice training data, in order to identify one or more recognized terms from the digital speech signal.

BRIEF DESCRIPTION OF THE DRAWINGS

The embodiments will hereinafter be described in conjunction with the following drawing figures, wherein like numerals denote like elements.

DETAILED DESCRIPTION

The following detailed description is merely representative in nature and is not intended to limit the inventive subject matter or the application and uses of the inventive subject matter. Furthermore, there is no intention to be bound by any theory presented in the preceding background or the following detailed description.

Although embodiments of the inventive subject matter that are implemented in aircraft-based speech recognition systems are described in detail below, it is to be understood that embodiments may be implemented in various other types of speech recognition systems and/or apparatus. These various types of systems and/or apparatus include, but are not limited to, systems implemented in aircraft, spacecraft, motor vehicles, water vessels, other types of vehicles and vessels, air traffic control (ATC) systems, an electronic records systems, robotic systems, hardware system control and monitoring systems (e.g., for manufacturing, energy production, mining, construction, and so on), computer system control and monitoring systems, and network control and monitoring systems, among other things. Accordingly, references herein to aircraft-based speech recognition systems are not intended to be limiting. Those of skill in the art will understand, based on the description herein, that other embodiments may be implemented in various other types of systems.

The inventive subject matter may be useful for various, diverse applications that may benefit from speech recognition in general, and voice-activated operational control that is based on speech-recognition techniques, in particular. For example, the inventive subject matter may be used in the context of voice-activated vehicular operations (e.g., aircraft, helicopter, automobile, or ship), voice-activated air traffic control operations, and voice-activated electronic documentation and/or records access processes, among other things. In the description below, an example application of voice-activated aircraft operations is described in more detail. Those of skill in the art will understand, based on the description herein, that other embodiments may be implemented to perform other types of operations.

In the context of voice-activated aircraft operations, speech processing methods and apparatus consistent with the inventive subject matter may be used to assist cockpit personnel (e.g., pilot, co-pilot, and navigator) in the performance of checklist related actions, data entry actions, data retrieval actions, and system control actions, among other things. For example, the inventive speech processing methods may be used in the performance of checklist related actions by helping to ensure that all checklist items associated with parameter checking and tasks during takeoff and landing have been appropriately completed. Data entry actions may include hands-free selection of radio frequencies/channels, setting of warning levels, specification of navigational information, and so on. Data retrieval actions may include hands-free retrieval of data (e.g., navigational, operational, and mission related data). System control actions may include hands-free control of various aircraft systems and modules, as will be described in more detail later.

The inventive subject matter includes methods and apparatus associated with a speech recognition system and a portable data storage device that is used in conjunction with the speech recognition system. The speech recognition system is operationally coupled with a host system, and speech commands and information that are recognized by the speech recognition system may be conveyed to the host system in order to control operations of the host system, input data to the host system, and/or retrieve data from the host system. For example, but not by way of limitation, the host system to which the speech recognition system is coupled may be any system selected from a group consisting of a vehicular control system, an aircraft control system, a spacecraft control system, a motor vehicle control system, a water vessel control system, an air traffic control (ATC) system, an electronic records system, a robotics system, a hardware system control and monitoring system, a computer system control and monitoring system, a network control and monitoring system, a portable system used for emergency search and rescue (e.g., first responder) operations, an industrial monitoring and control system (e.g., used in the context of power plants, refineries, off-shore oil drilling stations, and so on), and various other types of systems.

The portable and removable data storage device, referred to herein as a "personal voice profile data" (PSPD) storage device, may be implemented as any one of a variety of portable data storage devices that are capable of storing voice training data (e.g., in the form of one or more voice profiles) associated with a particular individual (e.g., a pilot or other system user). For example, but not by way of limitation, a PSPD storage device may be any device selected from a group consisting of a memory card, a contact smartcard, a contactless smartcard, a memory stick, a secure digital (SD) card, a multimedia card, a subscriber identity module (SIM) card, a universal serial bus (USB) flash drive, a compact disc, a Bluetooth device, a wireless communications device, and a storage device integrated with a headset.

Implementation of a PSPD storage device in conjunction with a speech recognition system, according to various embodiments, may provide one or more advantages over prior speech recognition systems. For example, implementation of the embodiments may result in a system that enjoys the benefits of both speaker-dependent and speaker-independent speech recognition systems, while avoiding some of the disadvantages of these types of systems.

More particularly, a speaker-dependent speech recognition system implements a training process for a system user, during which user utterances (e.g., speech) are input to the system, digitized, and analyzed to develop a voice profile that may be used during future interactive sessions to increase the accuracy of speech recognition. However, previous speech recognition system store the voice profile in the system itself, and the user must undergo a new training process if the user it to use a different system that implements speaker-dependent speech recognition. In the aircraft context, for example, a pilot in a cockpit of a first aircraft may interact with a cockpit-based speech recognition system to perform a training process, and the voice profile generated during the training process is stored in the speech recognition system and may be used during future operations of that aircraft. However, when the pilot enters the cockpit of a second aircraft, the pilot must undergo another training process to generate a voice profile to be stored in the speech recognition system of the second aircraft, using prior techniques. Repetition of the training process for each aircraft in which a pilot flies is time consuming, and is a dissuading factor in the implementation of speech recognition based control of aircraft systems.

In contrast with a speaker-dependent speech recognition system, a speaker-independent speech recognition system does not typically require a training procedure. However, speaker-independent speech recognition systems tend to have decreased accuracy, when compared with speaker-dependent speech recognition systems. Accordingly, implementation of a speaker-independent speech recognition system may be undesirable in an environment in which high speech recognition accuracy is desired.

By employing a PSPD storage device in conjunction with a speech recognition system, according to various embodiments, a pilot may carry his or her voice profile data from aircraft to aircraft, and the aircraft's speech recognition system may access the pilot's voice profile data during subsequent speech recognition sessions. This enables the relatively high accuracy of a speaker-dependent type system to be enjoyed without the necessity for undergoing a new training session each time the pilot operates a different aircraft. In addition, each speech recognition system that interacts with the PSPD storage device may generate updated voice profile data, and the updated voice profile data may be stored on the PSPD storage device and carried with the pilot to the next aircraft. Updates may include modifying a currently existing voice profile that is stored on the PSPD storage device, and/or generating a new voice profile to be stored on the PSPD storage device. This enables accurate voice profiles to be accessible to any speech recognition system, including voice profiles that take into account variations in the speaker's voice due to illness, stress, and other factors, and variations relating to different levels and characteristics of ambient noise, for example. By enabling the pilot to carry updated, accurate voice profiles that cover various voice and noise scenarios from aircraft to aircraft, speech recognition system accuracy and efficiency may be dramatically increased, when compared with prior systems and methods. Various embodiments will now be described in more detail in conjunction with FIGS. 1-9.

Figure 1:
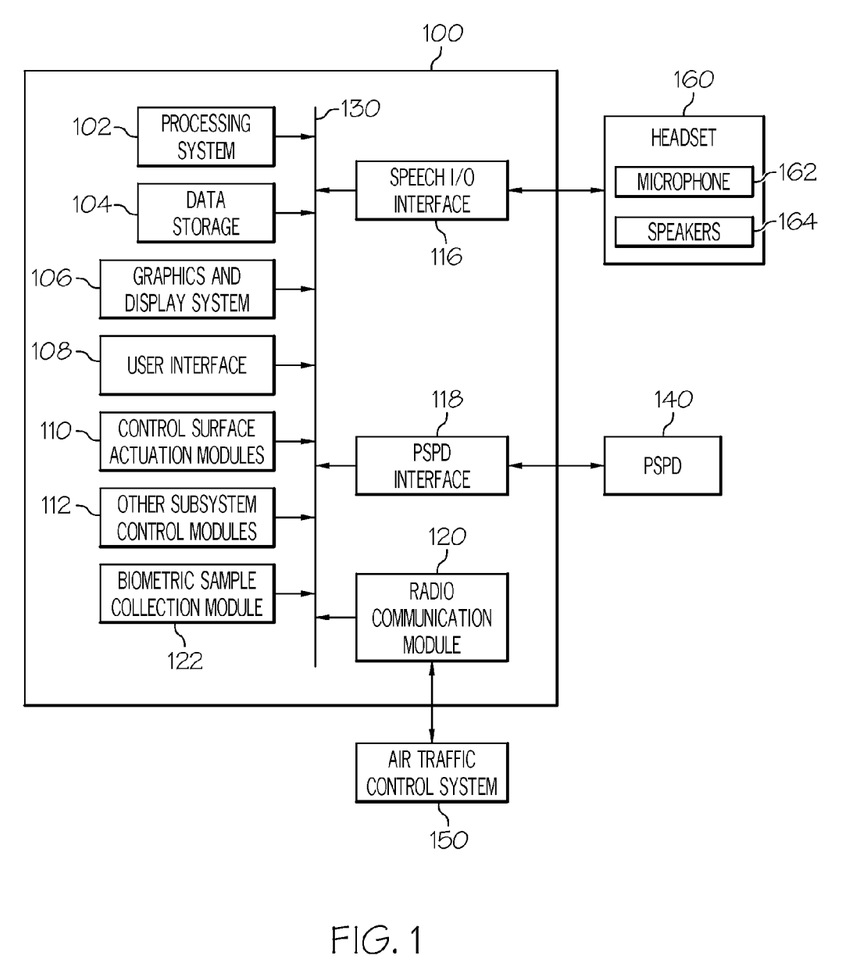
FIG. 1 is a schematic block diagram of an aircraft system with an integrated speech recognition system, in accordance with an example embodiment.

FIG. 1 is a schematic block diagram of an aircraft system 100 with an integrated speech recognition system, in accordance with an example embodiment. The illustrated embodiment of the aircraft system 100 includes, without limitation: at least one processing system 102; an appropriate amount of data storage 104; a graphics and display system 106; a user interface 108; control surface actuation modules 110; other subsystem control modules 112; a speech input/output (I/O) interface 116; a PSPD interface 118; and a radio communication module 120. In addition, aircraft system 100 optionally may include a biometric sample collection module 122, in an embodiment. These elements of the aircraft system 100 may be coupled together by a suitable interconnection architecture 130 that accommodates data communication, the transmission of control or command signals, and/or the delivery of operating power within the aircraft system 100. It should be understood that FIG. 1 is a simplified representation of the aircraft system 100 that will be used for purposes of explanation and ease of description, and that FIG. 1 is not intended to limit the application or scope of the subject matter in any way. In practice, the aircraft system 100 and the host aircraft will include other devices and components for providing additional functions and features, as will be appreciated in the art. Furthermore, although FIG. 1 depicts the aircraft system 100 as a single unit, the individual elements and components of the aircraft system 100 could be implemented in a distributed manner using any number of physically distinct pieces of hardware or equipment.

The processing system 102 may be implemented or realized with one or more general purpose processors, content addressable memory, digital signal processors, application specific integrated circuits, field programmable gate arrays, any suitable programmable logic devices, discrete gate or transistor logic, discrete hardware components, or any combination designed to perform the functions described here. A processor device may be realized as a microprocessor, a controller, a microcontroller, or a state machine. Moreover, a processor device may be implemented as a combination of computing devices (e.g., a combination of a digital signal processor and a microprocessor, a plurality of microprocessors, one or more microprocessors in conjunction with a digital signal processor core, or any other such configuration) . As described in more detail below, the processing system 102 may implement a speech recognition algorithm and, when operating in that context, may be considered a speech recognition system. Implementation of the speech recognition algorithm may include accessing voice training data from a PSPD storage device (e.g., PSPD storage device 140) via PSPD interface 118. In addition, the processing system 102 may generate commands, which may be communicated through interconnection architecture 130 to various other system components. Such commands may cause the various system components to alter their operations, provide information to the processing system 102, or perform other actions, non-limiting examples of which will be provided below.

The data storage 104 may be realized as RAM memory, flash memory, EPROM memory, EEPROM memory, registers, a hard disk, a removable disk, a CD-ROM, or any other form of storage medium known in the art. In this regard, the data storage 104 can be coupled to the processing system 102 such that the processing system 102 can read information from, and write information to, the data storage 104. In the alternative, the data storage 104 may be integral to the processing system 102. As an example, the processing system 102 and the data storage 104 may reside in an ASIC. In practice, a functional or logical module/component of the aircraft system 100 might be realized using program code that is maintained in the data storage 104. For example, the processing system 102, the graphics and display system 106, the control modules 110, 112, the speech I/O interface 116, the PSPD interface 118, the radio communication module 120, and/or the biometric sample collection module 122 may have associated software program components that are stored in the data storage 104. Moreover, the data storage 104 can be used to store data (e.g., voice training data) utilized to support the implementation of speech recognition and the operation of the aircraft system 100, as will become apparent from the following description.

The graphics and display system 106 includes one or more displays and associated graphics processors. Processing system 102 and graphics and display system 106 cooperate to display, render, or otherwise convey one or more graphical representations, synthetic displays, graphical icons, visual symbology, or images associated with operation of the host aircraft. An embodiment of the aircraft system 100 may utilize existing graphics processing techniques and technologies in conjunction with the graphics and display system 106. For example, graphics and display system 106 may be suitably configured to support well known graphics technologies such as, without limitation, VGA, SVGA, UVGA, or the like.

User interface 108 is suitably configured to receive input from a user (e.g., a pilot) and, in response to the user input, to supply appropriate command signals to the processing system 102. The user interface 108 may include any one, or any combination, of various known user interface devices or technologies, including, but not limited to: a cursor control device such as a mouse, a trackball, or joystick; a keyboard; buttons; switches; knobs; levers; or dials. Moreover, the user interface 108 may cooperate with the graphics and display system 106 to provide a graphical user interface. Thus, a user can manipulate the user interface 108 by moving a cursor symbol rendered on a display, and the user may use a keyboard to, among other things, input textual data. For example, the user could manipulate the user interface 108 to initiate or influence execution of the speech recognition application by the processing system 102, input a personal identification number (PIN) or other machine-readable key, initiate or influence access by the system 100 to information stored on a PSPD storage device (e.g., PSPD storage device 140), or the like.

In an exemplary embodiment, the radio communication module 120 is suitably configured to support data communication between the host aircraft and one or more remote systems. For example, the radio communication module 120 may be designed and configured to enable the host aircraft to communicate with an air traffic control (ATC) system 150. In this regard, the radio communication module 120 may include or support a datalink subsystem that can be used to provide ATC data to the host aircraft and/or to send information from the host aircraft to the ATC system 150, preferably in compliance with known standards and specifications. In certain implementations, the radio communication module 120 is also used to communicate with other aircraft that are near the host aircraft. For example, the radio communication module 120 may be configured for compatibility with Automatic Dependant Surveillance-Broadcast (ADS-B) technology, with Traffic and Collision Avoidance System (TCAS) technology, and/or with similar technologies.

Control surface actuation modules 110 include electrical and mechanical systems configured to control the orientation of various flight control surfaces (e.g., ailerons, wing flaps, rudder, and so on). Processing system 102 and control surface actuation modules 110 cooperate to adjust the orientation of the flight control surfaces in order to affect the attitude and flight characteristics of the host aircraft. Processing system 102 also may cooperate with other subsystem control modules 112 to affect various aspects of aircraft operations. For example, but not by way of limitation, the other subsystem control modules 112 may include, but are not limited to, a landing gear actuation module, a cabin environment control system, a throttle control system, a propulsion system, a radar system, and a data entry system.

Speech I/O interface 116 is suitably configured to couple headset 160 with the system 100, which enables system 100 to communicate with a system user (e.g., a pilot) through speech. For example, when the system user produces an utterance that is captured as an analog signal by a microphone 162, speech I/O interface 116 digitizes the analog speech signal, and provides the digital speech signal to processing system 102 for analysis by a speech recognition algorithm. In addition, processing system 102 and other system components (e.g., radio communication module 120) may provide digital speech signals to speech I/O interface 116, which may generate analog speech signals from the digital speech signals, and provide the analog speech signal to one or more speakers 164 of the headset 160.

PSPD interface 118 is suitably configured to provide data communications capabilities between system 100 and a PSPD storage device 140. As will be described in detail below, the data communications may include transferring voice training data stored on PSPD storage device 140 to system 100 (e.g., to a data cache of data storage 104), transferring updated or new voice training data from system 100 to PSPD storage device 140, and/or transferring user identification (ID) verification information (e.g., biometric information, a PIN, and/or another key) stored on PSPD storage device 140 to system 100, for example. PSPD interface 118 is configured to facilitate communications between system 100 and a PSPD storage device 140 over a data communication link 142. Data communication link 142 can be a wired or wireless link, depending on the type of communications technology that is implemented by PSPD storage device 140. In either case, PSPD interface 118 and PSPD storage device 140 exchange data according to a given data communications protocol.

According to an embodiment, PSPD interface 118 is either physically located in the cockpit of the host aircraft or within wireless communication range of a PSPD storage device 140 within the cockpit, so that the PSPD interface 118 is readily accessible to a system user located within the cockpit (e.g., a pilot). More particularly, when PSPD storage device 140 is a type of storage device that requires direct, physical interconnection with PSPD interface 118 for data transfer to occur, PSPD interface 118 includes cockpit-located, structural and electrical features that enable the system user to physically couple the PSPD storage device 140 to the PSPD interface 118. In contrast, when PSPD storage device 140 is a type of storage device that supports wireless data transfer, PSPD interface 118 may be located in the cockpit or in a different location that is within wireless communication range of the cockpit and the PSPD storage device 140.

The selection of PSPD interface 118 depends on the type of PSPD storage device 140 that system 100 will support. Besides providing a data communications interface, PSPD interface 118 is also configured to provide mechanical and electrical coupling between system 100 and the PSPD storage device 140, in an embodiment. For example, for types of PSPD storage devices 140 that implement wired communications, PSPD interface 118 may include mechanical features designed to physically secure the PSPD storage device 140 in a position that enables electrical contact between contacts of the PSPD interface 118 and contacts of the PSPD storage device 140. In addition, PSPD interface 118 may provide power to the PSPD storage device 140 through one or more contacts. In embodiments in which PSPD storage device 140 communicates wirelessly, PSPD interface 118 includes a wireless communication module configured to facilitate communication between PSPD storage device 140 and PSPD interface 118 according to a wireless communications protocol (e.g., a Bluetooth protocol, an Application Protocol Data Unit (APDU) communication protocol according to ISO/IEC 14443-4, an IEEE 802.11 protocol, and so on). PSPD interface 118 may include, for example but not by way of limitation, an interface selected from a group consisting of a memory card reader, a contact smartcard reader, a contactless smartcard reader, a memory stick reader, a secure digital (SD) card reader, a multimedia card reader, a subscriber identity module (SIM) card reader, a universal serial bus (USB) interface, a compact disc reader, a Bluetooth interface, a wireless communications interface, and a headset interface.

PSPD storage device 140 is physically distinct from the speech recognition system 100, and is suitably configured to store and provide access to voice training data for an individual. In addition, in an embodiment, PSPD storage device 140 is configured to store and provide access to user ID verification information (e.g., biometric information, a PIN, and/or another key) to system 100 through PSPD interface 118, which information may be evaluated by system 100 to determine whether a particular system user is authorized to access certain features of the speech recognition functionality of system 100. In an embodiment, PSPD storage device 140 is a device selected from a group consisting of a memory card, a contact smartcard, a contactless smartcard, a memory stick, an SD card, a multimedia card, a SIM card, a USB flash drive, a compact disc, a Bluetooth device, a wireless communications device, and a storage device integrated with a headset (e.g., headset 160). In an embodiment in which PSPD storage device 140 is integrated with headset 160, data may be exchanged between PSPD storage device 140 (or headset 160) and system 100 through speech I/O interface 116.

Biometric sample collection module 122 is suitably configured to collect a biometric sample from a system user, to analyze the sample, and to provide information regarding the sample and/or the correlation between a collected sample and a stored sample to processing system 102. Biometric sample collection module 122 includes components configured to detect one or more intrinsic physical traits of the system user. For example, but not by way of limitation, biometric sample collection module 122 may detect one or more biometric characteristics of a system user, where the biometric characteristics include characteristics selected from a group consisting of a fingerprint, a retina and/or iris appearance, facial features, voice, DNA, and so on. Accordingly, biometric sample collection module 122 may include one or more optical scanners, digital cameras, microphones, blood collection devices, thermal sensors, scanners or cameras, body area sensor networks, and other types of biometric sample collection devices. As will be described in more detail later, evaluation of biometric characteristics for an individual may be used in conjunction with authorizing the individual to gain access to certain aspects of the speech recognition system.

Figure 2:
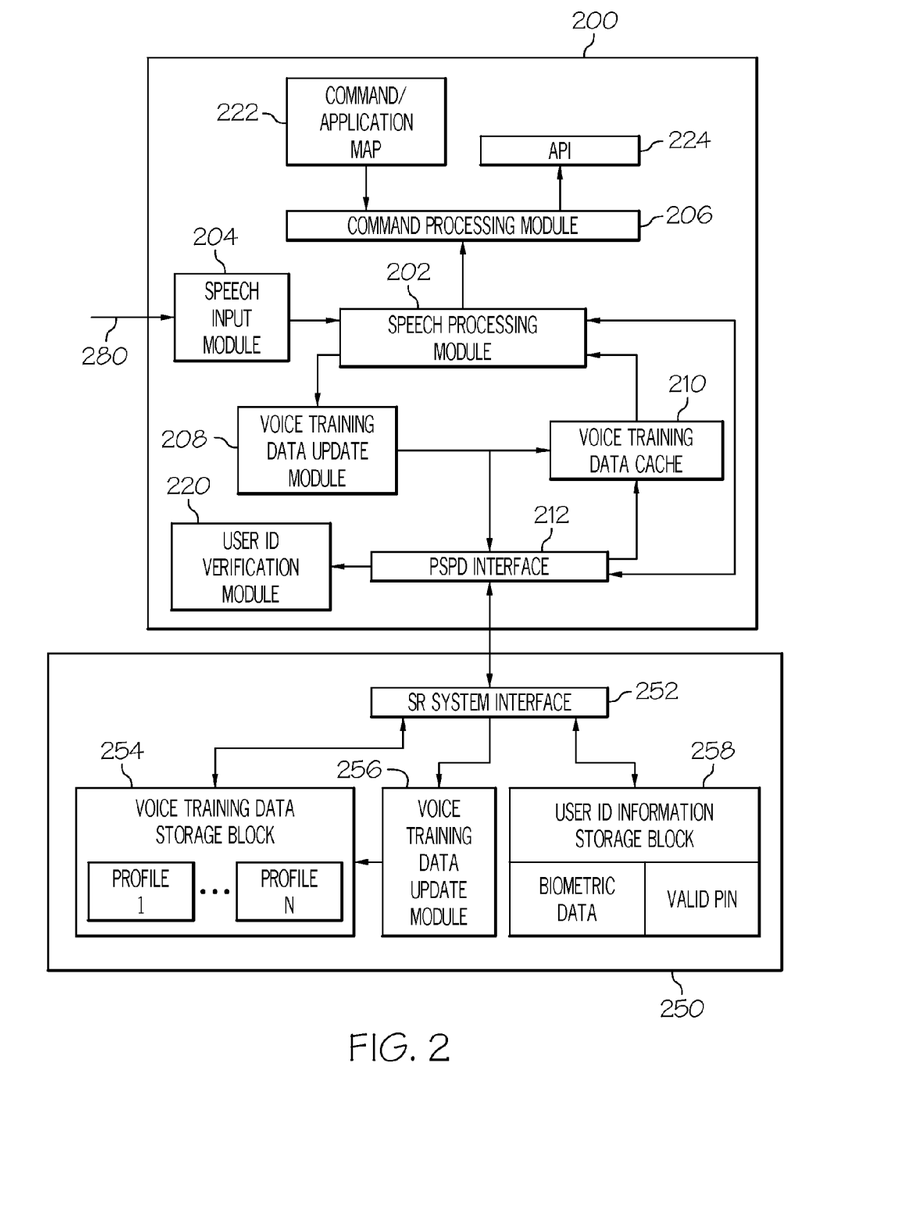
FIG. 2 is a functional block diagram of a speech recognition system and a personal speech profile data (PSPD) storage device, in accordance with an example embodiment.

FIG. 2 is a functional block diagram of a speech recognition system 200 and a PSPD storage device 250, in accordance with an example embodiment. The illustrated embodiment of the speech recognition system 200 includes, without limitation: a speech processing module 202; a speech input module 204; a command processing module 206; a voice training data update module 208; a voice training data cache 210; and a PSPD interface 212. In addition, speech recognition system 200 optionally may include a user identity (ID) verification module 220, in an embodiment. A processing system (e.g., processing system 102, FIG. 1) of the aircraft system may implement speech processing module 202, speech input module 204 (in conjunction with speech I/O interface 116, FIG. 1), command processing module 206, voice training data update module 208, and user ID verification module 220 by executing program code associated with these various functionalities. In addition, the voice training data cache 210 may be implemented as data storage that is closely coupled with the processing system, or as separate data storage (e.g., data storage 104, FIG. 1) of the system. The user ID verification module 220 may be implemented by the processing system (e.g., processing system 102) in conjunction with either a user interface (e.g., user interface 108, FIG. 1), when a PIN number (or other key) is used for user ID verification, or with a biometric sample collection module (e.g., biometric sample collection module 122, FIG. 1), when biometric information is used for user ID verification.

The illustrated embodiment of the PSPD storage device 250 includes, without limitation: a speech recognition (SR) system interface 252; one or more voice training data storage blocks 254, and a voice training data update module 256. In addition, PSPD storage device 250 optionally may include one or more user ID information storage blocks 258, in an embodiment. SR system interface 252 may be implemented by a processing module (e.g., integrated circuit 406, FIG. 4) of PSPD storage device 250. For a contact type of PSPS storage device (e.g., devices 400, 600, 700, 800, 900, FIGS. 4-9), SR system interface 252 may include electrical contacts configured to mate with corresponding electrical contacts of PSPD interface 212, in order to provide for data transfers between PSPD storage device 250 and PSPD interface 212. Alternatively, for a contactless type of PSPS storage device (e.g., device 500, FIG. 5), SR system interface 252 may include an inductive coil (e.g., conductive traces 506, FIG. 5), antenna, and other components, in order to provide for wireless data transfers between PSPD storage device 250 and corresponding components of PSPD interface 212.

According to an embodiment, data storage blocks 254, 258 include non-volatile memory that may be realized as RAM memory, flash memory, EPROM memory, EEPROM memory, or any other form of storage medium known in the art. In an alternate embodiment, PSPD storage device 250 may include a battery, and data storage blocks 254, 258 may include volatile memory.

To initiate the functionality of speech recognition system 200 and PSPD storage device 250, a system user (e.g., a pilot) performs actions associated with enabling data transfer between speech recognition system 200 and PSPD storage device 250. When PSPD storage device 250 is a type of storage device that requires direct, physical interconnection with PSPD interface 212 for data transfer to occur, these actions include the system user physically coupling the PSPD storage device 250 with the PSPD interface 212. For example, the system user may insert the PSPD storage device 250 into a slot or port of PSPD interface 212, where the slot or port is configured to physically support PSPD storage device 250 and to physically couple electrical contacts of PSPD storage device 250 and PSPD interface 212. In addition, and/or when PSPD storage device 250 is a type of storage device that supports wireless data transfer, the system user may provide inputs to the speech recognition system 200 (e.g., via user interface 108, FIG. 1), that enables data transfer to occur between the PSPD interface 212 and the SR system interface 252.

According to an embodiment, once the PSPD storage device 250 and speech recognition system 200 are communicatively coupled (i.e., data transfer between the devices is enabled), the user ID verification module 220 may initiate a user identity verification procedure, which is designed to verify that the system user (e.g., the pilot or speaker) is the individual associated with the PSPD storage device 250 (i.e., the individual whose voice profiles are stored on the PSPD storage device 250). Essentially, the user identity verification procedure involves comparing or correlating user inputted identity-indicating information (e.g., biometric data, a PIN, or another key) with corresponding user identity information previously stored on the PSPD storage device 250 (e.g., in the user ID information storage block 256).

For example, the user ID verification module 220 may prompt the system user to provide user identity-indicating information. Prompts may include audio prompts to a speaker (e.g., speakers 164, FIG. 1) and/or visual prompts displayed by a display device (e.g., a display device of graphics and display system 106, FIG. 1). According to an embodiment in which the identity-indicating information is biometric information, the system user is prompted to provide a biometric sample (e.g., a scanned fingerprint, retina, and/or iris, a facial image, a voice sample, or a blood sample), and the system collects the biometric sample (e.g., via biometric sample collection module 122, FIG. 1). According to another embodiment in which the identity-indicating information is a PIN number or other key, the system user is prompted to enter a PIN number or key (e.g., via user interface 108, FIG. 1). The user ID verification module 220 then compares or correlates the user provided identity-indicating information (e.g., the biometric sample, the entered PIN, or the entered key) with the corresponding user identity information retrieved from the PSPD storage device 250 (via PSPD interface 212). For example, the user ID verification module 220 may correlate a collected biometric sample with biometric data stored on the PSPD storage device 250. The biometric data stored on the PSPD storage device 250 may include a digital representation (e.g., a digital image or sound file) of a corresponding biometric feature, and the collected biometric sample may be represented in a compatible digital format. When a sufficient correlation is present between the biometric sample and the biometric data, access to the speech recognition features of system 200 may be granted. Alternatively, the user ID verification module 220 may compare a user entered PIN with a valid PIN retrieved from the PSPD storage device 250. When the entered PIN and the valid PIN match, access to the speech recognition features of system 200 may be granted.

In an alternate embodiment, the user identity verification apparatus and methods may be fully incorporated into the PSPD storage device 250 (e.g., the PSPD storage device 250 may include a keypad, fingerprint scanner, or other biometric sample collection apparatus). In another alternate embodiment, the system may not support user identity verification at all, and the corresponding user identity verification components of the speech recognition system 200 and the PSPD storage device 250 may be excluded. In yet another alternate embodiment, the voice training data within the voice training data storage block 254 may be encrypted, and when the user-provided, identity-indicating information sufficiently matches the user identity information retrieved form the PSPD storage device 250, the system may decrypt the voice training data.

Upon completion of the user identity verification procedure, if one is performed, speech recognition system 200 initiates the transfer of voice training data from the voice training data storage block 254 of PSPD storage device 250 to the voice training data cache 210 through PSPD interface 212 and SR system interface 252, in an embodiment. In an embodiment, Basic Access Control (BAC) or some other data security protocol may be used to protect the communication channel between the PSPD storage device 250 and the speech recognition system 200 by encrypting transmitted information (e.g., voice profile data). In such an embodiment, before data can be read from the PSPD storage device 250, the speech recognition system 200 will provide a key to the PSPD storage device 250, and the PSPD storage device 250 uses the key to encrypt the voice profile data prior to transmitting it to the speech recognition system 200. The speech recognition system 200, in turn, may use the key to decrypt the received, encrypted voice profile data.

As will be explained in more detail later, the voice training data stored in voice training data storage block 254 may include voice training data associated with a single voice profile for an individual, or voice training data associated with a plurality of voice profiles for the individual (e.g., from 1 to N profiles). Each voice profile may be associated with different vocal characteristics (e.g., relaxed speech, stressed speech, speech when the individual is healthy, speech when the individual has an upper respiratory infection, and so on) and/or different ambient noise characteristics (e.g., quiet environment, a low engine noise environment such as during taxiing or cruising flight, or a high engine noise environment such as during takeoff, landing, climbing), and so on. One of the voice profiles may be designated as a default profile, in an embodiment.

Initiation and control of the voice training data transfer may be coordinated by speech processing module 202, for example, which may issue commands to the PSPD interface 212 to obtain voice training data from the PSPD storage device 250 that is associated with a first voice profile (e.g., the default profile). According to an embodiment, the PSPD interface 212 interacts with the SR system interface 252 to specify a particular voice profile, and the PSPD interface 212 receives and conveys the voice profile data to the voice training data cache 210. Caching the voice profile data on the speech recognition system 200 enables speech processing module 202 readily to access the voice profile data. In an alternate embodiment, the voice profile data may not be cached in the speech recognition system 200, and speech processing module 202 may instead access the voice profile data directly from the PSPD storage device 250.

Speech processing module 202 executes a speech recognition algorithm that uses the voice profile data from the PSPD storage device 250 to identify one or more recognized terms from a digital speech signal 280. The digital speech signal 280 is generated (e.g., by microphone 162 and speech I/O interface 116, FIG. 1) in response to utterances made by the system user, and speech input module 204 is configured to receive and convey the speech signal 280 to speech processing module 202. In an embodiment, speech input module 204 may cache the received speech data within speech signal 280 for later consumption by speech processing module 202.

Speech processing module 202 may execute any type of speech recognition algorithm that uses voice profile data (i.e., training data) in conjunction with speech recognition. For example, but not by way of limitation, speech processing module 202 may execute a speech recognition algorithm that utilizes Hidden Markov Models (HMMs) for modeling and recognizing patterns from sequential speech data, and which use voice training data (e.g., voice profile data) to train the system. HMMs are statistical models, which output a sequence of symbols or quantities. For example, an HMM periodically may output a sequence of n-dimensional, real valued vectors (e.g., cepstral coefficients). Each word (or phoneme) has a different output distribution, and an HMM for a sequence of words or phonemes can be made by concatenating the individual trained HMMs for separate words and phonemes. When the speech recognition algorithm is presented with a new utterance, speech decoding may use the Viterbi algorithm to find a best path. Alternatively, the speech recognition algorithm may use dynamic time warping, artificial neural network technology and Bayesian networks, or other speech recognition techniques.

According to an embodiment, the speech recognition algorithm produces recognized terms from a known set of vocabulary terms, which are typical of the application (e.g., controlling an aircraft), and which also are known to system users. The known vocabulary terms may include terms associated with typical commands that may be uttered by a system user (e.g., "change radio frequency to 127.7 megahertz," "lower flaps to 15 degrees," and so on). Speech processing module 202 communicates the recognized vocabulary terms to command processing module 206, which is configured to determine a system response based on commands formed from the recognized terms, and to generate control signals 290 to cause the aircraft system to implement the system response. In various embodiments, the command processing module 206 is configured to generate control signals 290 to affect the operation of one or more aircraft subsystems selected from a group of subsystems consisting of a radio communication module (e.g., module 120, FIG. 1), a graphics and display system (e.g., system 106, FIG. 1), a control surface actuation module (e.g., module 110, FIG. 1), a landing gear actuation module, a cabin environment control system, a throttle control system, a propulsion system, a radar system, a data entry system, and other types of aircraft subsystems.

According to an embodiment, command processing module 206 implements appropriate system responses (i.e., generates appropriate control signals 290) by executing applications associated with various known commands. More particularly, command processing module 206 may map a recognized voice command received from the speech processing module 202 to a particular application action (e.g., actions such as storing data, retrieving data, or controlling a component of the aircraft, among other things) using command/application mapping data 222. Command processing module 206 also may communicate information regarding the action to an application programming interface (API) 224 associated with a host system component configured to perform the action.

For example, for a recognized command relating to cockpit operations, command processing module 206 may map the command to a cockpit operations application action, and may communicate information regarding the action to API 224, which may thereafter initiate execute an appropriate cockpit operations application, which is configured to initiate from 1 to N different types of actions associated with cockpit operations. Recognized commands relating to cockpit operations may include, for example but not by way of limitation: i) checklist related commands (e.g., commands associated with ensuring that all parameter checking and tasks associated with take-off/landing checklists have been completed); ii) data entry related commands (e.g., commands for setting radio frequencies, selecting channels, setting warning levels (e.g., Bingo fuel, A_Low, Floor, and so on), and other commands); iii) commands associated with controlling multifunction displays (e.g., radar displays, jammer displays, and so on); and iv) data retrieval related commands (e.g., retrieving data associated with the mission, speed, altitude, attitude, location, direction of flight, angle of approach for landing, external atmospheric conditions, cabin conditions, fuel status, and rates of change of various parameters). Some of the cockpit operations application actions that are mapped to the commands (and executed) may include providing human perceptible information (e.g., data) via a display system and/or audio system. A response generator associated with the cockpit operations application may generate and provide a response signal to display and/or audio components of a user interface (e.g., graphics and display system 106 and/or speech I/O interface 116, FIG. 1). The user interface may interpret the response signal and appropriately control the display and/or audio components to generate human perceptible information (e.g., displayed information or audibly output information) corresponding to the interpreted response signal.

As another example, for a recognized command of "change radio frequency to 127.7 megahertz", command processing module 206 may map the command to a radio control application action, and may communicate information regarding the action to API 224, which may thereafter initiate execute an appropriate radio control application. Execution of the radio control application may result in the production of a response signal destined for the radio communication module (e.g., radio communication module 120, FIG. 1), which causes the radio communication module to switch frequencies to 127.7 megahertz. Similarly, command processing module 206 may initiate execution of applications that cause the graphics and display system (e.g., system 106, FIG. 1) to alter displayed information, applications that cause control surface actuation modules (e.g., modules 110, FIG. 1) to change the configuration of one or more flight control surfaces, and/or actions that cause other subsystem control modules to change their operation (e.g., lower/raise landing gear, change cabin pressure or temperature, contact flight attendants, and so on).

According to an embodiment, voice training data update module 208 is configured to generate updated voice training data and metadata based on the digital speech signal 280, and to provide the updated voice training data and metadata to the PSPD storage device 250 through the PSPD interface 212. In an embodiment, updated voice training data is generated and provided when a current speech sample (e.g., a speech sample obtained from the user after initiation of the system) has an insufficient correlation with voice profiles previously downloaded from or currently stored on PSPD storage device 250. More specifically, the voice training data update module 208 may enter an update mode and generate a new voice profile that reflects new voice training data. The voice training data update module 208 then automatically updates the voice training information on the PSPD storage device 250. Accordingly, the voice training data update module 208 has the ability to train and add voice profiles into the existing set of profiles for the user. The voice training data update module 208 may use any of a variety of standard learning machines or learning systems concepts (e.g., Neural Network based training procedures) in order to provide the ability to produce updated voice training data.

In order to facilitate such updates, PSPD storage device 250 includes voice training data update module 256, which is configured to receive the updated voice training data from the speech recognition system 200 through the SR system interface 252, and to store the updated voice training data in the voice training data storage block 254. When the updated voice training data corresponds to an existing profile (e.g., a profile that is currently stored in the voice training data storage block 254), voice training data update module 256 overwrites the existing profile with the updated voice training data. Otherwise, when the updated voice training data does not correspond to an existing profile, voice training data update module 256 creates a new profile that includes the updated voice training data, and stores the new profile in the voice training data storage block 254. For example, when there is significant variation in the user's current voice profile from any of the stored voice training profiles, the speech recognition system 200 may initiate creation of a new profile, which may be stored on the PSPD storage device 250. The previously or newly generated voice profiles may be continuously updated until the speech recognition session ends.

Figure 3:
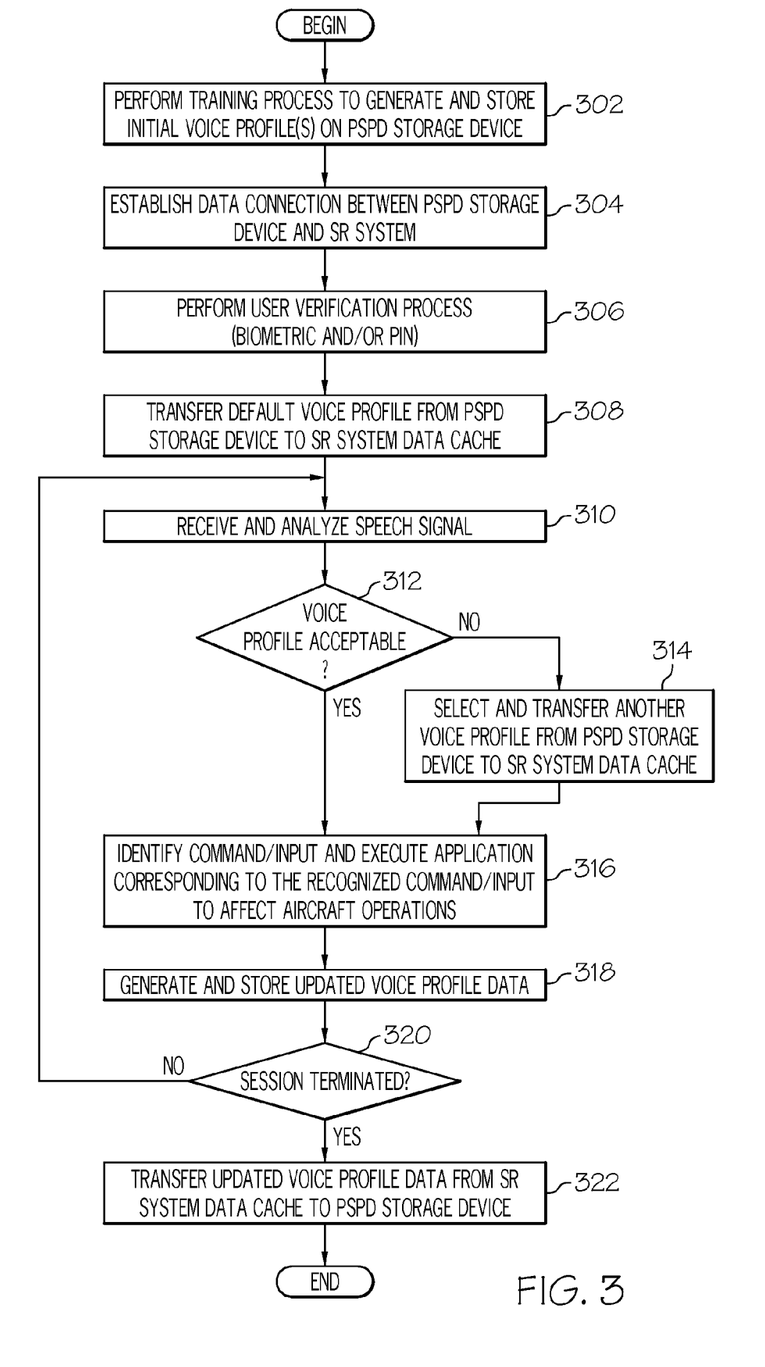
FIG. 3 illustrates a flowchart of a method for performing speech processing, in accordance with an example embodiment.

FIG. 3 illustrates a flowchart of a method for performing speech processing, in accordance with an example embodiment. The method is performed by a speech recognition system (e.g., speech recognition system 200, FIG. 2) in conjunction with a PSPD storage device (e.g., PSPD storage device 250, FIG. 2). The method begins, in block 302, by performing a training process to generate and store initial voice training data (e.g., one or more initial voice profiles stored in voice training data storage block 254, FIG. 2) for an individual (e.g., a pilot or other system user) on a PSPD storage device. The initial voice training data may be generated by an in-cockpit speech recognition system, or by a separate training system configured to produce initial voice training data. The training system may be configured to produce different voice profiles for different ambient noise conditions (e.g., a quiet environment, a low engine noise environment, and/or a high engine noise environment), according to an embodiment. Upon completion of the initial training process, the individual may thereafter carry the PSPD storage device to another speech recognition system (e.g., a speech recognition system in a cockpit of an aircraft), and the stored, initial voice training data may thereafter be accessed by the other speech recognition system in conjunction with executing a speech recognition algorithm.

In addition to generating and storing initial voice training data, the training process also may include collecting and storing user verification data on the PSPD storage device. For example, the speech recognition system may prompt the individual to provide a biometric sample through a biometric sample collection module (e.g., biometric sample collection module 122, FIG. 1), such as a fingerprint, iris, or retina scan, a photograph of the individual's face, or a voice sample. A digital image of the biometric sample is then stored on the PSPD storage device (e.g., in user ID information storage block 258, FIG. 2). Alternatively, the speech recognition system may prompt the individual to enter a PIN number or other verification information (e.g., social security number, birthdate, or verification question answer), and the entered information is stored on the PSPD storage device.

In block 304, the PSPD storage device (with initial voice training data stored thereupon) is made accessible to a speech recognition system. This may include, for example, establishing communications capabilities between a PSPD interface (e.g., PSPD interface 212, FIG. 2) of the speech recognition system and an SR system interface (e.g., SR system interface 252, FIG. 2) of the PSPD storage device. For example, for a contact-type PSPD storage device, the PSPD storage device may be inserted into a port or other type of PSPD storage device reader of the speech recognition system, and the speech recognition system may initiate a handshaking process to establish accessibility of the voice training data on the PSPD storage device. Alternatively, for a contactless-type of PSPD storage device, the PSPD storage device may be brought into wireless communication range (e.g., for RF communications or for inductive coupling), and a handshaking process may be performed.

In block 306, a user verification process is then optionally performed. As discussed previously, the user verification process may include the speech recognition system prompting the individual to provide user verification information, such as a biometric sample, a PIN number, or another type of verification information. Prompts may be provided as display messages presented by a graphics and display system (e.g., graphics and display system 106, FIG. 1) and/or as audible commands via a speech I/O interface (e.g., speech I/O interface 116, FIG. 1) and a speaker (e.g., speaker 164, FIG. 1). The speech recognition system accesses user verification information stored on the PSPD storage device, and compares it with the user-provided, user verification information. When a sufficient correlation is present between the user-provided, user verification information and the user verification information stored on the PSPD storage device, access to the speech recognition system is granted. Otherwise, access to the system is denied, in an embodiment.

In block 308, the speech recognition system initiates transfer of voice training data from the PSPD storage device to the speech recognition system (e.g., to voice training data cache 210, FIG. 2). As indicated previously, the PSPD storage device 250 is configured to store voice training data (e.g., in voice training data storage block 254), which is based on speech captured during previous speech/voice sessions (e.g., the initial training sessions and/or subsequent sessions). More particularly, the PSPD storage device 250 functions as a data bank for storing one or more voice profiles for an individual (e.g., "Profile 1", . . . "Profile N"). Storage and selectability of multiple voice profiles for an individual enables the speech recognition system more accurately to recognize speech, despite variations in the system user's speech (e.g., variations due to respiratory illness, emotional speech variations, and so on) and audible variations in the operating environment (e.g., variations in ambient noise).

In an embodiment, a decision making system of the speech recognition system (e.g., implemented within speech processing module 202, FIG. 2) selects a voice profile that best matches specific operating condition parameters (e.g., predictions or measurements of ambient noise, characteristics of received speech, and so on). Selection of the voice profile either may be done manually or automatically. For example, manual selection of a voice profile may include the system user providing indications through the system's user interface (e.g., user interface 108, FIG. 1) that the user is in the cockpit, and indicating whether or not the user has any illness that may affect the user's speech characteristics. Based on that information, a corresponding voice profile may be indicated to the speech recognition system. Automatic selection of a voice profile may include the speech recognition system matching patterns in the user's speech data (e.g., speech data received via microphone 162 and speech I/O interface 116, FIG. 1) with the voice training data stored in the PSPD storage device 250. For example, the speech recognition system may prompt the user to provide a voice sample (e.g., by speaking into microphone 162, FIG. 1) from which a determination may be made of whether the user's speech patterns better match any particular stored voice profile. Automatic selection of a voice profile also or alternatively may be made based on system knowledge of the operational state of the engines and/or through sampling of the ambient noise (e.g., via microphone 162 and speech I/O interface 116, FIG. 1), for example.

In still another embodiment, when multiple voice profiles are stored on the PSPD storage device, the speech recognition system initially may access a voice profile designated as a "default" profile, and the speech recognition system may thereafter switch to a different profile if speech recognition performance using the default profile is sufficiently low. Because the initial voice profile transfer is likely to be performed while the aircraft is on the ground (e.g., prior to engine start), the default voice profile may, for example, correspond to a voice profile associated with a quiet environment. In addition, the default voice profile may correspond to a voice profile associated with the individual being in a healthy and non-stressed state.

Once voice training data has been transferred to the speech recognition system, steady-state operations of the speech recognition system may commence. This includes, in block 310, the speech recognition system receiving and analyzing speech signals produced as a result of utterances made by the system user. The speech signals may be produced, for example, by a microphone (e.g., microphone 162, FIG. 1) and a speech I/O interface (e.g., speech I/O interface 116, FIG. 1), and provided to a processing system (e.g., processing system 102, FIG. 1) on which the speech recognition algorithm is being executed.

A speech processing module (e.g., speech processing module 202, FIG. 2) may thereafter analyze the speech signal. As part of the analysis, the speech recognition system may determine, in block 312, whether the previously-downloaded voice profile is acceptable to be used for further speech processing. This may include performing various correlation processes between the received speech signal and the downloaded voice profile to determine whether an error measure relating to the speech recognition process are sufficiently low. When the error measure is not sufficiently low, the speech recognition system may select and transfer another voice profile from the PSPD storage device to the speech recognition system (e.g., voice training data cache 210, FIG. 2), in block 314.

Once a new voice profile has been transferred or when the error measure is sufficiently low, the speech recognition system may further analyze the speech signal to attempt to recognize speech from the signal (e.g., to identify a known phoneme, word or term from the signal), in block 316. In addition, the speech recognition system may identify a particular, known command or input phrase from the recognized speech. As discussed previously, a command processing module (e.g., command processing module 206, FIG. 2) may perform a mapping process to determine an application corresponding to the recognized command or input phrase, and the command processing module may initiate execution of the application. Execution of the application may affect some aspect of aircraft operations (e.g., changing radio frequencies, altering the configuration of a flight control surface, deploying or retracting landing gear, and so on).

During the processing of speech, the speech recognition system also may generate updated voice profile data, in block 318. As the voice profile data is updated, the speech recognition system may overwrite relevant portions of the voice profile data currently stored in the voice training data cache (e.g., voice training data cache 210, FIG. 2). In addition, the speech recognition system may designate the updated voice training data in the cache as an entirely new voice profile when the speech recognition system determines that either the ambient noise or the individual's speech characteristics insufficiently match any voice profiles that had been previously stored on the PSPD storage device. More particularly, when the updated voice training data diverges sufficiently from the voice training data that initially was transferred from the PSPD storage device to the speech recognition system, the speech recognition system may designate the cached voice training data as a new voice profile.

A determination is made, in block 320, whether the speech session has been terminated. This may be determined when the system user indicates that he or she intends to terminate the session (e.g., through user interface 108, FIG. 1), when operations of the aircraft is being terminated, or based on some other input. When the speech session has not been terminated, the method iterates as shown. When the speech session has been terminated, the speech recognition system may send the updated voice profile data to the PSPD storage device, in block 322, and a voice training data update module (e.g., voice training data update module 256, FIG. 2) of the PSPD storage device may overwrite the corresponding, stored voice profile with the updated voice profile data. Alternatively, when the speech recognition system indicates that the updated voice profile data corresponds to a new voice profile, the voice training data update module may store the updated voice profile data as a new voice profile. In an alternate embodiment, the previously or newly generated voice training profiles may be continuously updated until the speech recognition session ends (e.g., in conjunction with block 318). The method then ends.

As mentioned previously, PSPD storage device 250 may be a contact-type storage device (i.e., a storage device that requires direct physical contact with a device reader for data transfer to occur) or a contactless-type storage device (i.e., a storage device for which data transfer occurs wirelessly through inductive means or a wireless communication protocol). Additionally, an embodiment may include a dual-interface storage device, which includes both contact-type and contactless interfaces. FIGS. 4-9 are external or cross-sectional views of various PSPD storage devices, in accordance with several example embodiments. The example PSPD storage devices illustrated in FIGS. 4-9 are not intended to be an exhaustive set of the types of devices that may be used as PSPD storage devices. Instead, it should be apparent to those of skill in the art, based on the description herein, that other types of portable devices also may be used as PSPD storage devices, including but not limited to other types of memory cards, SIM cards, compact discs, wireless communications devices (e.g., cellular telephones, personal data assistants, computers, wireless local area network devices, wireless personal area network devices, wireless devices implementing a wireless technology standard under the trademark "Bluetooth", and so on), and storage devices integrated with a headset (e.g., headset 160, FIG. 1).

Figure 4:
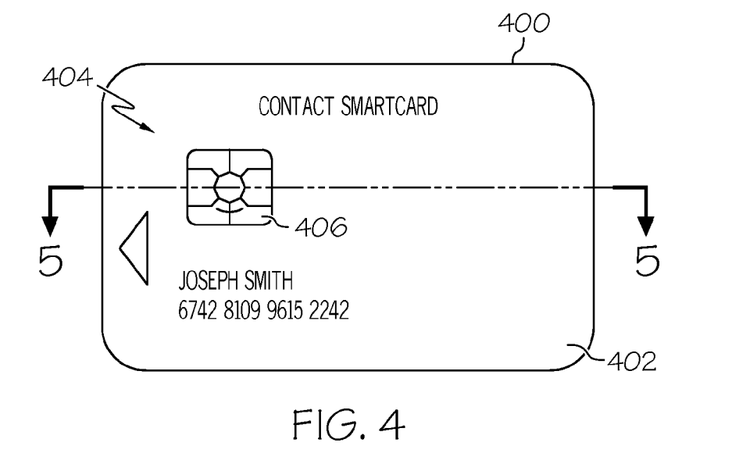
FIGS. 4-9 are external or cross-sectional views of various PSPD storage devices, in accordance with several example embodiments.
Figure 5:
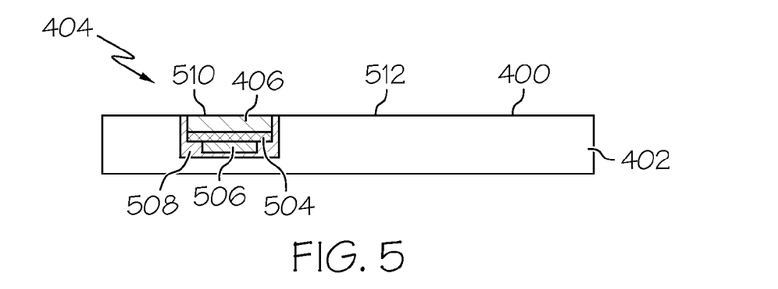

More particularly, FIGS. 4 and 5 are external and cross-sectional views, respectively, of a PSPD storage device implemented as a contact smartcard 400, according to an example embodiment. Smartcard 400 includes a rigid or semi-rigid housing 402 and an integrated data storage system 404, which is accessible through contact pads 406. As illustrated in FIG. 5, which is a cross-sectional view of smartcard 400 along lines 5-5 of FIG. 4, the integrated data storage system 404 includes the contact pads 406, insulating layer 504, and integrated circuit 506 housed within an aperture 508 in housing 402. According to an embodiment, integrated circuit 506 includes a non-volatile memory circuit suitably configured to store voice training data for an individual. In addition, the non-volatile memory circuit may be configured to store a PIN number and/or biometric information associated with the individual, according to an embodiment. Integrated circuit 506 also may include one or more processing or other components configured to interact with the memory circuit and/or to perform other tasks. For example, but not by way of limitation, integrated circuit 506 also may include a tamper-resistant security system (e.g., a secure crytoprocessor and/or secure file system), which may be employed to protect the data stored in the memory components of integrated circuit 506.

Contact pads 406 have top surfaces 510 that are substantially co-planar with a top surface 512 of housing 402. The contact area (i.e., the height and width of contact pads 406 when viewed from the top view of FIG. 4) is about 1.0 centimeters (cm) by 1.0 cm, in an embodiment. Contact pads 406 may be associated with various types of inputs and outputs, including for example, a power supply input, a reset signal input, a clock signal input, a ground contact, a programming voltage input, and a serial input/output port (e.g., half duplex), among other things.

Conductive interconnects (not shown in FIG. 5) electrically couple contact pads 406 with integrated circuit 506. This enables data (e.g., voice training data, PIN numbers, and/or biometric data) to be exchanged between memory components of integrated circuit 506 and an external system (e.g., aircraft system 100, FIG. 1) when the contact pads 406 are brought into physical contact with corresponding contact pads of a contact smartcard reader (e.g., a smartcard interface of the external system, such as PSPD interface 118, FIG. 1). According to an embodiment, smartcard 400 does not include a battery or other energy source, and power is provided to smartcard 400 by the smartcard reader when smartcard 400 is installed in the reader.

According to an embodiment, smartcard 400 has a width of about 85.60 millimeters (mm), a height of about 53.98 mm, and a thickness of about 0.76 mm. In another embodiment, smartcard 400 has a width of about 25 mm, a height of about 15 mm, and a thickness of about 0.76 mm. In still other embodiments, the width, height, and/or thickness of smartcard 400 may be greater or less than the example dimensions given above.

Figure 6:
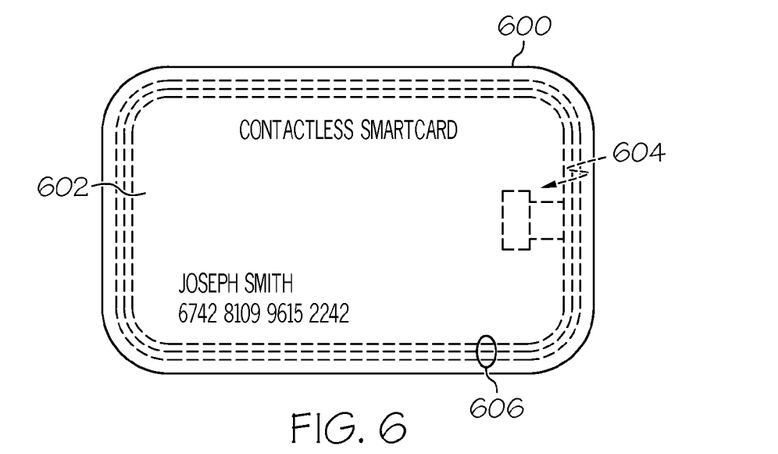

FIG. 6 is an external view of a PSPD storage device implemented as a contactless smartcard 600, according to an example embodiment. Smartcard 600 is similar to smartcard 300 (FIG. 3), in that smartcard 600 also includes a rigid or semi-rigid housing 602 and an integrated data storage system 604 (shown in phantom). However, the integrated data storage system 604 of smartcard 600 is accessible wirelessly, rather than through contact pads (e.g., contact pads 406 (FIG. 4)). More particularly, smartcard 600 also includes a pattern of coiled conductive traces 606, operatively coupled with the integrated data storage system 604. Conductive traces 606 enable smartcard 600 to communicate with and be powered by an external system (e.g., aircraft system 100, FIG. 1) through RF induction technology, when the smartcard 600 is brought into wireless communication range of an antenna of a contactless smartcard reader (e.g., a smartcard interface of the external system, such as PSPD interface 118, FIG. 1). Using RF induction technology as a means to communicate, conductive traces 606 may function as an input/output port, a power supply input, a reset signal input, a clock signal input, a ground contact, and a programming voltage input, among other things.

Conductive traces 606 are electrically coupled with integrated data storage system 604. This enables data (e.g., voice training data, PIN numbers, and/or biometric data) to be exchanged between memory components of integrated data storage system 604 and an external system (e.g., aircraft system 100, FIG. 1) when the smartcard 600 is brought into wireless communication range of an antenna of a contactless smartcard reader. According to an embodiment, smartcard 600 does not include a battery or other energy source, and power is provided to smartcard 600 by the smartcard reader when smartcard 600 is in close physical proximity to the reader.

According to an embodiment, integrated data storage system 604 includes a non-volatile memory circuit suitably configured to store voice training data for an individual. In addition, the non-volatile memory circuit may be configured to store a PIN number and/or biometric information associated with the individual, according to an embodiment. Integrated data storage system 604 also may include one or more processing or other components configured to interact with the memory circuit and/or to perform other tasks. For example, but not by way of limitation, integrated data storage system 604 also may include a tamper-resistant security system (e.g., a secure crytoprocessor and/or secure file system), which may be employed to protect the data stored in the memory components of integrated data storage system 604.

According to an embodiment, smartcard 600 has a width of about 85.60 mm, a height of about 53.98 mm, and a thickness of about 0.76 mm. In another embodiment, smartcard 500 has a width of about 25 mm, a height of about 15 mm, and a thickness of about 0.76 mm. In still other embodiments, the width, height, and/or thickness of smartcard 600 may be greater or less than the example dimensions given above.

Figure 7:
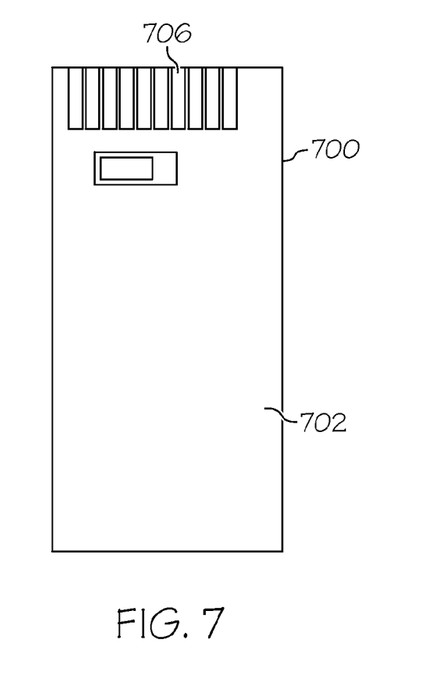

FIG. 7 is an external view of a PSPD storage device implemented as a memory stick 700, according to an example embodiment. Memory stick 700 includes a rigid housing 702 and an integrated data storage system (not shown in FIG. 7), which is externally accessible through contact pads 706. According to an embodiment, the integrated data storage system includes a non-volatile memory circuit suitably configured to store voice training data for an individual, and possibly user identity verification information (e.g., a valid PIN number and/or biometric information). The integrated data storage system also may include one or more processing or other components configured to interact with the memory circuit and/or to perform other tasks.

When the electrical contacts 706 are brought into physical contact with corresponding contact pads of a memory stick reader, data (e.g., voice training data, PIN numbers, and/or biometric data) may be exchanged between memory components of the integrated data storage system and an external system (e.g., aircraft system 100, FIG. 1). According to an embodiment, memory stick 700 does not include a battery or other energy source, and power is provided to memory stick 700 by the memory stick reader when memory stick 700 is installed in the reader. According to an embodiment, memory stick 700 has a width of about 21.8 mm, a height of about 50 mm, and a thickness of about 2.8 mm. In another embodiment, the width, height, and/or thickness of memory stick 700 may be greater or less than the example dimensions given above.

Figure 8:
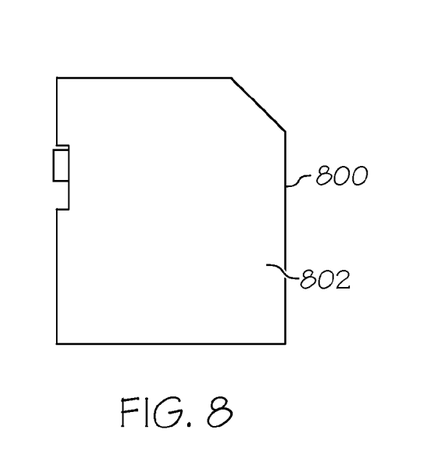

FIG. 8 is an external view of a PSPD storage device implemented as a secure digital (SD) or multimedia card 800, according to an example embodiment. Card 800 includes a rigid housing 802 and an integrated data storage system (not shown in FIG. 8), which is externally accessible through contact pads (not shown in FIG. 8). According to an embodiment, the integrated data storage system includes a non-volatile memory circuit suitably configured to store voice training data for an individual, and possibly user identity verification information (e.g., a valid PIN number and/or biometric information). The integrated data storage system also may include one or more processing or other components configured to interact with the memory circuit and/or to perform other tasks.

When the electrical contacts of card 800 are brought into physical contact with corresponding contact pads of a card reader, data (e.g., voice training data, PIN numbers, and/or biometric data) may be exchanged between memory components of the integrated data storage system and an external system (e.g., aircraft system 100, FIG. 1). According to an embodiment, card 800 does not include a battery or other energy source, and power is provided to card 800 by the card reader when card 800 is installed in the reader. According to an embodiment, card 800 has a width in a range of about 10 to 50 mm, a height in a range of about 10 to 40 mm, and a thickness in a range of about 0.75 to 2.1 mm. In another embodiment, the width, height, and/or thickness of card 800 may be greater or less than the example dimensions given above.

Figure 9:
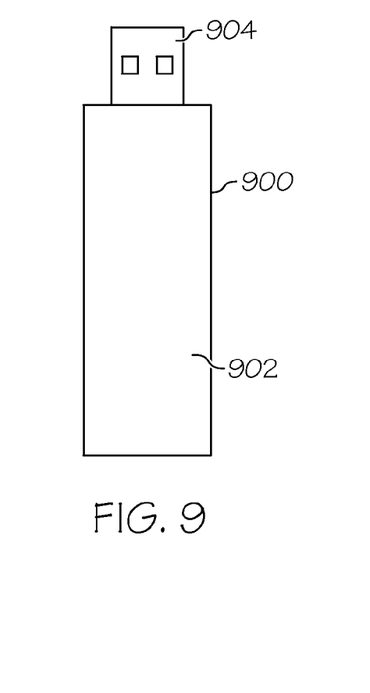

FIG. 9 is an external view of a PSPD storage device implemented as a USB flash drive 900, according to an example embodiment. USB flash drive 900 includes a rigid housing 902, a male-type USB connector 904, and an integrated data storage system (not shown in FIG. 9), which is externally accessible through the USB connector 904. According to an embodiment, the integrated data storage system includes a non-volatile memory circuit suitably configured to store voice training data for an individual, and possibly user identity verification information (e.g., a valid PIN number and/or biometric information). The integrated data storage system also may include one or more processing or other components configured to interact with the memory circuit and/or to perform other tasks.

When the USB connector 904 is inserted into a corresponding female-type USB connector (e.g., part of PSPD interface 212, FIG. 2), data (e.g., voice training data, PIN numbers, and/or biometric data) may be exchanged between memory components of the integrated data storage system and an external system (e.g., speech recognition system 200, FIG. 2). According to an embodiment, USB flash drive 900 does not include a battery or other energy source, and power is provided to USB flash drive 900 by the external system when USB flash drive 900 is installed in the system. According to an embodiment, USB flash drive 900 has a width of about 15 mm, a height of about 70 mm, and a thickness of about 10 mm. In another embodiment, the width, height, and/or thickness of USB flash drive 900 may be greater or less than the example dimensions given above.

Embodiments of speech recognition methods and apparatus have now been described. Implementations of such methods and apparatus may provide one or more advantages over traditional methods and apparatus. For example, in an embodiment implemented in an aircraft system, the above described embodiments of the inventive subject matter enable a pilot to bring up-to-date voice profile information (stored on a PSPD storage device) with him or her into the cockpit of each aircraft that is operated by the pilot. When a speaker-dependent speech recognition algorithm is implemented on the aircraft, the voice profile information ported to the aircraft using a PSPD storage device eliminates the need for the pilot to participate in a training session in order to train the speech recognition algorithm. Accordingly, the accuracy of a well-trained, speaker-dependent speech recognition algorithm may be achieved without the need for system training.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

What is claimed is:

1. A speech recognition system of an aircraft comprising:
   a personal speech profile data (PSPD) interface configured to receive voice training data, which is associated with an individual, from a PSPD storage device that is physically distinct from the speech recognition system;
   a speech input module configured to produce a digital speech signal derived from an utterance made by a system user; and
   a speech processing module, operatively coupled to the speech input module, and configured to selectively retrieve the voice training data stored on the PSPD storage device through the PSPD interface based on operating condition parameters of the aircraft and a characteristic of the system user, and to execute a speech processing algorithm that analyzes the digital speech signal using the voice training data, in order to identify one or more recognized terms from the digital speech signal.

2. The speech recognition system of claim 1, further comprising:
   a voice training data cache, operatively coupled between the speech processing module and the PSPD interface, and configured to receive the voice training data from the PSPD interface and to provide access to the voice training data to the speech processing module.

3. The speech recognition system of claim 1, wherein the PSPD interface is selected from a group consisting of a memory card reader, a contact smartcard reader, a contactless smartcard reader, a memory stick reader, a secure digital (SD) card reader, a multimedia card reader, a subscriber identity module (SIM) card reader, a universal serial bus (USB) interface, a compact disc reader, a Bluetooth interface, a wireless communications interface, and a headset interface.

4. The speech recognition system of claim 1, further comprising the PSPD storage device, which comprises:
   a speech recognition system interface configured to interact with the PSPD interface in order to provide access to the voice training data to the speech processing module; and
   data storage, operatively coupled with the speech recognition system interface, and configured to store the voice training data.

5. The speech recognition system of claim 4, wherein the PSPD storage device is selected from a group consisting of a memory card, a contact smartcard, a contactless smartcard, a memory stick, a secure digital (SD) card, a multimedia card, a subscriber identity module (SIM) card, a universal serial bus (USB) flash drive, a compact disc, a Bluetooth device, a wireless communications device, and a storage device integrated with a headset.

6. The speech recognition system of claim 4, wherein the speech recognition system further comprises a user identity verification module, operatively coupled with the PSPD interface, and configured to collect a biometric sample from the system user, to access biometric data associated with the individual from the PSPD storage device through the PSPD interface, and to grant access to the speech recognition system to the system user when a sufficient correlation is present between the biometric sample and the biometric data.

7. The speech recognition system of claim 4, wherein the speech recognition system further comprises a user identity verification module, operatively coupled with the PSPD interface, and configured to enable the system user to provide an entered personal identification number (PIN), to access a valid PIN associated with the individual from the PSPD storage device through the PSPD interface, and to grant access to the speech recognition system to the system user when the entered PIN and the valid PIN match.

8. The speech recognition system of claim 4, wherein the PSPD storage device further comprises a voice training data update module, operatively coupled to the PSPD interface, and configured to generate updated voice training data based on the digital speech signal, and to provide the updated voice training data to the PSPD storage device through the PSPD interface.

9. The speech recognition system of claim 1, further comprising:
   a command processing module, operatively coupled to the speech processing module, and configured to determine a system response based on the one or more recognized terms, and to generate one or more control signals to cause a host system coupled to the speech recognition system to implement the system response.

10. The speech recognition system of claim 9, wherein the host system is selected from a group consisting of, an aircraft control system, a spacecraft control system, an air traffic control (ATC) system, an electronic records system, a robotics system, a hardware system control and monitoring system, a computer system control and monitoring system, a network control and monitoring system, a portable system used for emergency search and rescue operations, and an industrial monitoring and control system.

11. The speech recognition system of claim 9, wherein the host system is an aircraft control system, and the command processing module is configured to generate the one or more control signals to cause the aircraft control system to affect operation of one or more aircraft subsystems selected from a group of subsystems consisting of a radio communication module, a graphics and display system, a control surface actuation module, a landing gear actuation module, a cabin environment control system, a throttle control system, a propulsion system, a radar system, and a data entry system.

12. A portable data storage device comprising:
  data storage configured to store voice training data associated with an individual and operating conditions of an aircraft; and
  a speech recognition system interface, operatively coupled with the data storage, and configured to interact with a portable data storage device interface of a speech recognition system of an aircraft in order to provide access to the voice training data to the speech recognition system of an aircraft, wherein the portable data storage device is physically distinct from the portable data storage device interface and the speech recognition system, and
  wherein the data storage is further configured to store a personal identification number (PIN) associated with the individual, and wherein the speech recognition system interface is further configured to interact with the portable data storage device interface of the speech recognition system in order to provide access to to perform verification of the pilot using the PIN.

13. The portable data storage device of claim 12, wherein the data storage device is selected from a group consisting of a memory card, a contact smartcard, a contactless smartcard, a memory stick, a secure digital (SD) card, a multimedia card, a subscriber identity module (SIM) card, a universal serial bus (USB) flash drive, a compact disc, a Bluetooth device, a wireless communications device, and a storage device integrated with a headset.

14. The portable data storage device of claim 12, wherein the data storage is further configured to store biometric data associated with the individual, and wherein the speech recognition system interface is further configured to interact with the portable data storage device interface of the speech recognition system in order to provide access to the biometric data.

15. The portable data storage device of claim 12, further comprising:
  a voice training data update module, operatively coupled to the speech recognition system interface, and configured to receive updated voice training data from the speech recognition system through the speech recognition system interface, and to store the updated voice training data in the data storage.

16. A method for performing speech processing on an aircraft, the method performed by a speech recognition system and comprising the steps of:
  selectively retrieving voice training data, which is associated with an individual, from a personal speech profile data (PSPD) storage device that is physically distinct from the speech recognition system based on operating condition parameters of the aircraft and characteristics of the individual;
  producing a digital speech signal based on an utterance made by a system user; and
  executing a speech recognition algorithm that analyzes the digital speech signal using the voice training data, in order to identify one or more recognized terms from the digital speech signal.

17. The method of claim 16, further comprising:
  collecting identity-indicating information from the system user;
  accessing user identity verification information, which is associated with the individual, from the PSPD storage device, wherein the user identity verification information is selected from a group consisting of biometric data and a personal identification number (PIN);
  performing an identity verification process to determine whether a correlation exists between the identity-indicating information and the user identity verification information; and
  granting access to the speech recognition system to the system user when a sufficient correlation is present between the identity-indicating information and the user identity verification information.

18. The method of claim 16, further comprising:
  determining a system response based on the one or more recognized terms; and
  generating one or more control signals to cause a host system coupled to the speech recognition system to implement the system response.

19. The method of claim 18, further comprising:
  generating updated voice training data based on the digital speech signal; and
  providing the updated voice training data to the PSPD storage device.

* * * * *